July 31, 1945. H. T. JEFFERY 2,380,651
PNEUMATIC EJECTOR
Filed Feb. 11, 1943 3 Sheets-Sheet 1
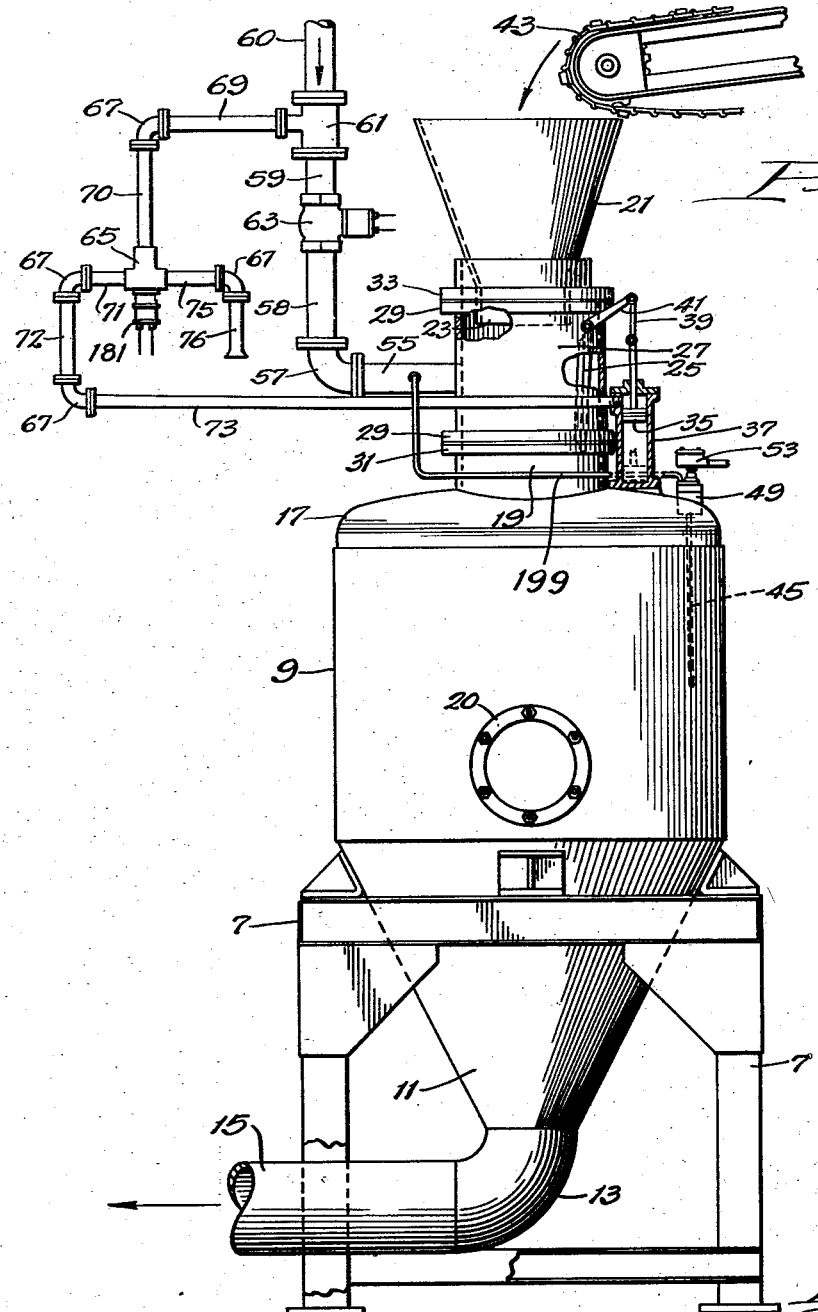
Fig.1
Inventor:
Harold T. Jeffery,
By Soans, Pond & Anderson
Attorneys.

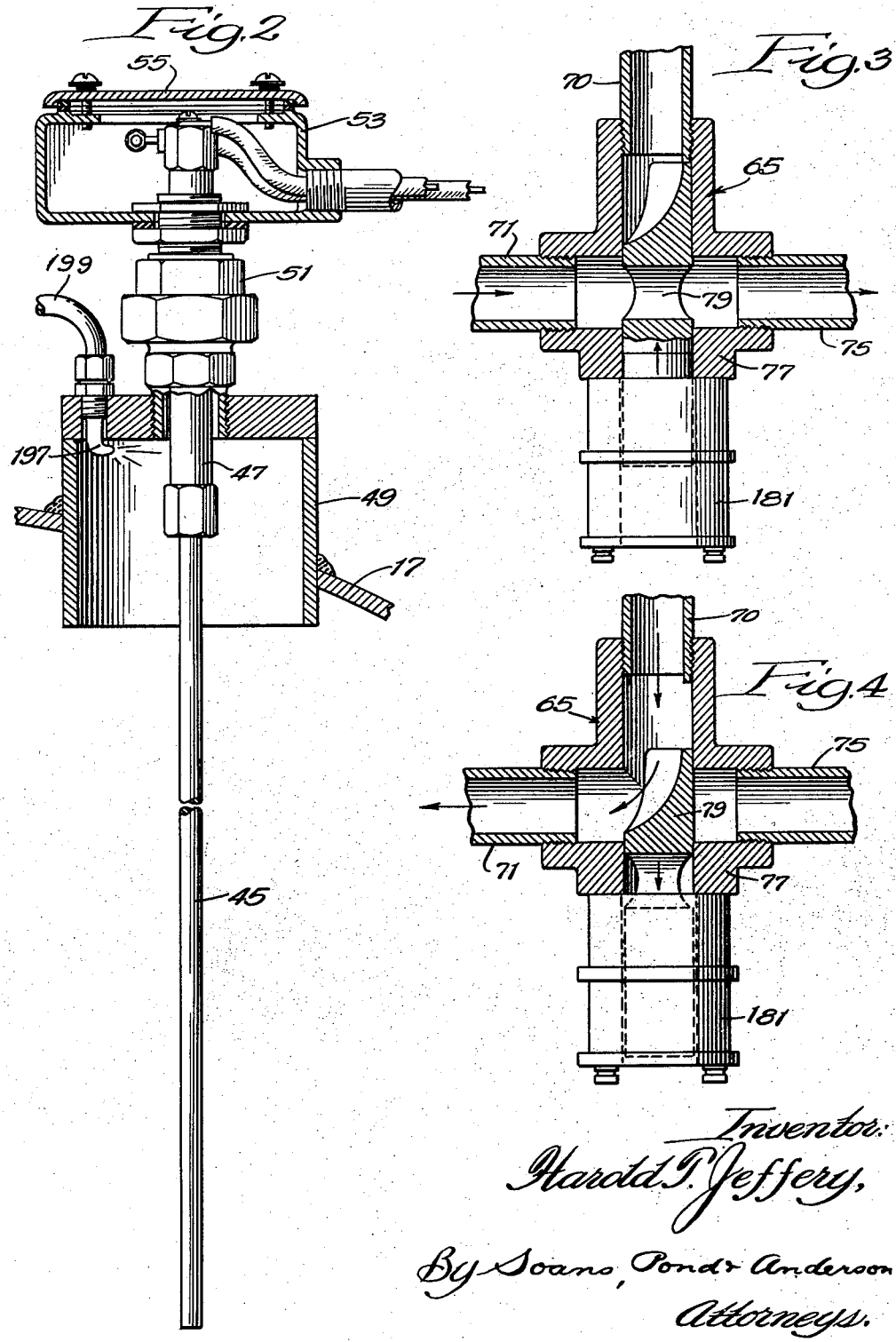

July 31, 1945.  H. T. JEFFERY  2,380,651
PNEUMATIC EJECTOR
Filed Feb. 11, 1943   3 Sheets-Sheet 3

Inventor:
Harold T. Jeffery,
By Soans, Pond & Anderson
Attorneys.

Patented July 31, 1945

2,380,651

UNITED STATES PATENT OFFICE 2,380,651

PNEUMATIC EJECTOR

Harold T. Jeffery, Wilmette, Ill., assignor to Yeomans Brothers Company, a corporation of Delaware Application February 11, 1943, Serial No. 475,577

2 Claims. (Cl. 302—53)

The present invention relates to pneumatic ejectors and is particularly concerned with pneumatic ejectors capable of use in the disposition of packing house waste and like materials.

The satisfactory handling of packing house waste and similar materials has long presented a serious problem to the conveying art. Because of sanitary considerations and because these materials often include large pieces, such as parts of the viscera of animals which may be very tough or very sticky, or both, it is not practical to elevate or to move wastes of this type for any considerable distances by belt or other continuous conveying means. Pneumatic ejectors have been proposed for handling wastes of this type, but in general, they have proven unsatisfactory and unreliable in operation. For example, a source of serious trouble in the prior devices has been the valves employed in the discharge side of the ejector apparatus. These valves became fouled and inoperative in very short periods of time requiring such frequent cleaning that use of the ejector becomes uneconomic. Other difficulties have been equally troublesome.

The present invention, as will hereinafter appear, overcomes the disadvantages of the prior art structures and makes possible the elimination of certain of the trouble producing valves and other apparatus which have heretofore been considered essential parts of pneumatic ejector systems. In actual experimental operation pneumatic ejectors and systems in accordance with the invention have proven highly satisfactory. The invention includes a novel ejector unit and a novel control system particularly adapted for use in connection with this ejector unit. The details of the apparatus and the various advantages of the invention will be made apparent by reference to the accompanying drawings and the following description of one preferred embodiment thereof.

In the drawings:

Fig. 1 is a side elevational view, partially in section, illustrating the features of an ejector unit constructed in accordance with the present invention and certain associated apparatus;

Fig. 2 is an enlarged, fragmentary view illustrating certain of the details of the control electrode and mounting which constitutes a part of the apparatus of Fig. 1;

Figs. 3 and 4 are enlarged sectional views illustrating diagrammatically certain of the features of the three-way valve which constitutes a part of the apparatus of Fig. 1;

Figure 5:
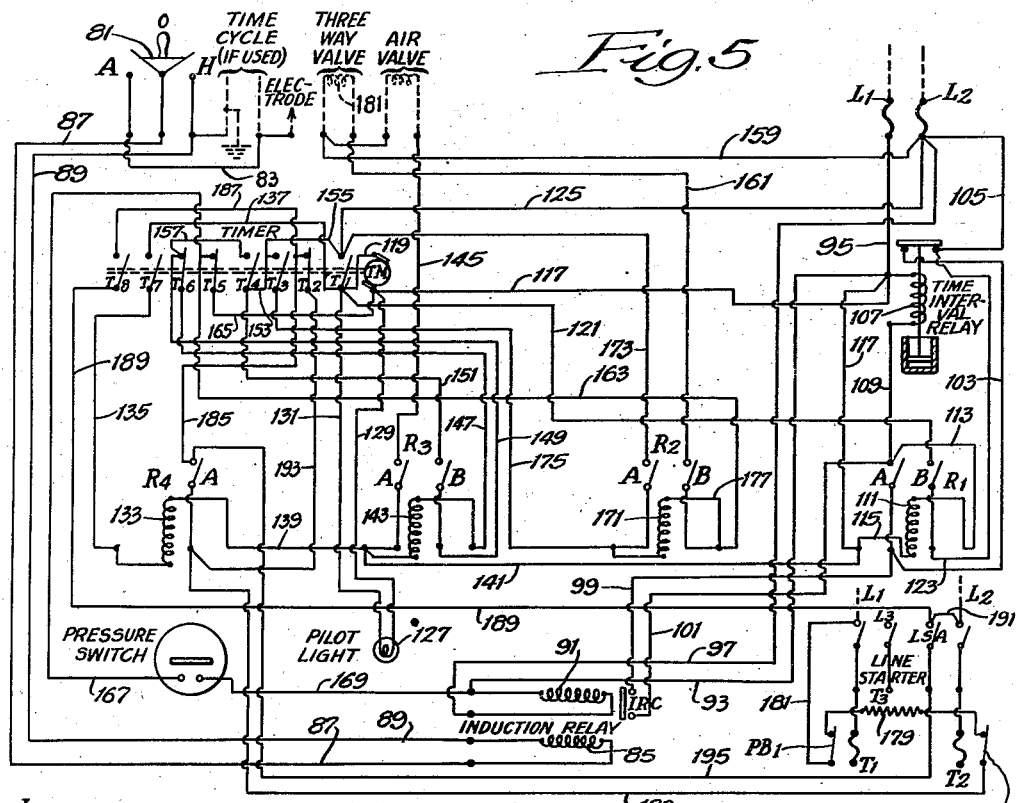
Fig. 5 is a complete wiring diagram of one embodiment of the ejector control system used of the present invention.

Referring to Fig. 1, the ejector unit of the embodiment of the invention there illustrated comprises a main frame 7 which may conveniently be fabricated of welded structural elements, and a cylindrical tank or receiver 9 for receiving and containing the waste or other material being handled by the apparatus. The receiver 9 is provided with a conically shaped bottom section 11 which is directly connected by an elbow 13 to a discharge pipe 15 which may be of any length. The upper end of the receiver 9 is closed by a suitable cover 17 having a flanged, inlet pipe connection 19 in the central portion thereof. The various parts of the receiver 9 may be made of welded plate, or of cast iron, or of other suitable material. The discharge end of the receiver 9 is normally open at all times and is connected directly to the discharge pipe 15 without the use of any valves or equivalent structure. A manhole 20 is provided to permit access to the interior of the receiver.

A combination hopper and inlet valve structure is bolted or otherwise attached to the receiver inlet pipe 19. This structure includes a conically shaped hopper 21, which terminates in a cylindrically shaped inner section 23 adapted to be closed by a circular flapper valve 25, and a suitably shaped valve body 27 which may conveniently include flanges 29 for facilitating its connection to the flange 31 at the upper end of the receiver inlet pipe 19 and the flange 33 at the lower end of the hopper 21. The flapper valve 25 is hingedly supported within the valve body 27 for movement from a normal open position, as illustrated in Fig. 1, to a closed position in which position it seats against the lower surface of the cylindrical hopper section 23.

In the structure illustrated, the flapper valve 25 is actuated by an air driven piston 35 which moves in a suitable cylinder 37 supported on the upper end of the receiver. The piston 35 is operatively connected to the flapper valve 25 by suitable linkages 39 and 41. When in its vertical or open position, as illustrated in Fig. 1, the flapper valve 25 is out of the way of the material which is discharged into the receiver 9 through the hopper 21. This prevents material which might impair the operation of the valve from collecting on the valve face.

The discharge end of a belt conveyor arranged to discharge into the hopper 21 is illustrated at 43 in Fig. 1. It will be understood that the means whereby the material to be handled by the ejector is delivered to the ejector receiver 9 is not an important part of the invention. The invention contemplates, however, that the delivery means can be placed under the control of the ejector control system, so as to provide for interrupting the delivery of the waste mamaterial to the ejector apparatus during the actual ejection operation.

A control electrode 45 is supported on the head of the receiver so as to extend downwardly into the receiver 9 as illustrated in Fig. 1. The support means for the electrode 45, as illustrated in Fig. 2, includes an insulator 47 and a metallic, cup shaped, insulator guard or shield 49 which is disposed about the upper end of the electrode 45 and the lower end of the electrode insulator 47 and which opens into the interior of the receiver 9, as illustrated particularly in Fig. 2. The electrode 45 and the insulator 47 are mechanicaly connected to the electrode guard by means of a union 51 or like means to permit convenient removal of the electrode from the receiver for inspection or replacement. The union 51 provides a gas tight seal. A conduit box 53 having a removable, gasket sealed cover 55 of conventional type is provided at the upper end of the electrode assembly for protecting the electrical connections.

An air inlet pipe 55 of substantial diameter is connected at one end to the valve body 27. The other end of the air inlet pipe 55 is connected to a source of pressure air through an elbow 57, pipe lengths 58, 59, and 60, a T connection 61, and a normally closed electrically operated valve 63. Air pressure is supplied to the operating piston 35 for the flapper valve 25 through a three-way, power operated valve 65, elbow fittings 67, and suitable pipe sections 69, 70, 71, 72, and 73. The initial pipe section 69 connects with the T connection 61 in the main supply line.

The three way valve 65 is normally in the position illustrated in Fig. 3. In this position the connection to the source of pressure air provided by the pipes 69 and 70 is shut off and the piston chamber 37 is vented to the atmosphere through the pipe sections 73 and 72, elbows 67 and the vent pipe sections 75 and 76.

The valve 65 may be of any standard type. The particular device illustrated in the drawings is an electrically operated valve, and includes a T-shaped body 77 within which the valve element 79 is adapted to be moved from the normal position of Fig. 3 to the position illustrated in Fig. 4 upon the energization of a suitable solenoid indicated at 181. When in the position of Fig. 4, the vent pipe 75 is closed, and pressure air is permitted to flow from the supply line 70 into the pipe section 71 which is connected to the upper end of the piston chamber 37 for the flapper valve operating piston 35, as previously described.

Figure 6:
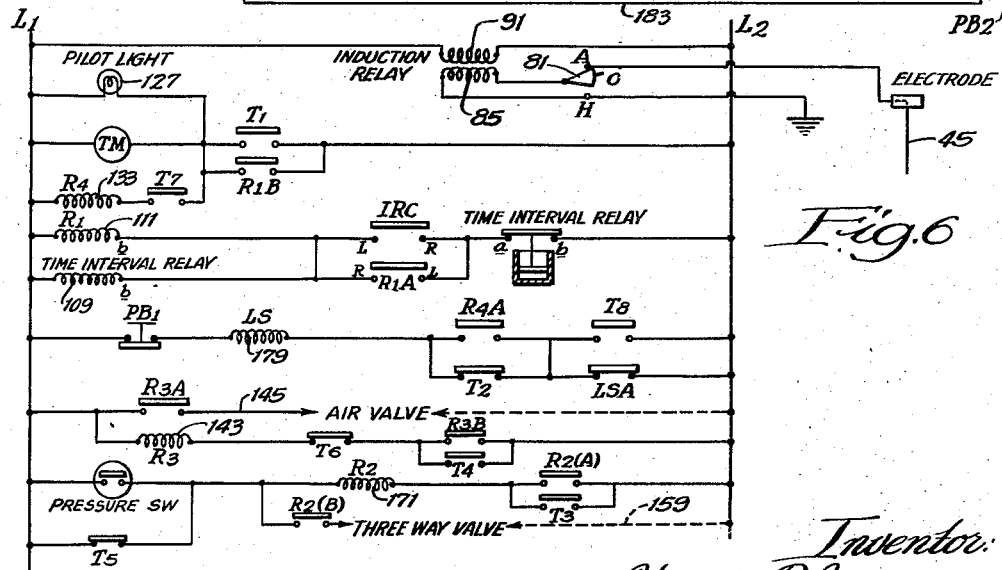
Fig. 6 is a schematic diagram of the control system.

The features of a preferred control system are illustrated in Figs. 5 and 6. This system is arranged for either automatic or manual operation, and it includes a single pole, double throw automatic-off-hand switch 81 as the main control element. The control system is so arranged that in response to the movement of the main switch 81 to the hand position, or in response to the operation of a relay controlled by the electrode 45 when the main control switch 81 is in the automatic position, a series of operations will take place in predetermined time sequence. The first operation in this sequence effects the stopping of the conveyor 43. Next, the flapper valve 25 is operated to close the inlet opening in the top of the receiver 9. Next, pressure air is admitted to the receiver 9 for a predetermined period of time. This air effects the ejection of the material in the receiver. As soon as the ejection operation is completed, the flapper valve 25 is reopened, and the conveyor 43, or other delivery means is again put in operation, the pressure air having been previously shut off. The complete apparatus is then restored to its original condition, and it is ready for the next cycle.

The control means utilized for accomplishing this operation sequence includes a single pole, single throw induction relay, the operation of which is controlled automatically or manually in accordance with the position of the main control switch 81, a motor driven timing mechanism which includes eight, single pole, single throw switches labeled $T_1$ to $T_8$ inclusive, a single pole, single throw, time interval relay, three double pole, single throw electro-magnetic relays R1, R2, and R3, one single pole, single throw electro-magnetic relay R4, a normally open single pole, single throw pressure switch, and a line starter or other electrically operated control means for the conveyor.

Referring particularly to the wiring diagram of Fig. 5 and the schematic diagram of Fig. 6, the electrode is connected to the A or automatic terminal of the main control switch 81 by the conductor 83. The central terminal of the switch 81 is connected to one side of the operating coil 85 for the induction relay by the conductor 87. The other side of the operating coil 85 for the induction relay is connected to the H terminal of the main control switch 81 by the conductor 89. One terminal of the normally energized coil 91 of the induction relay is connected to the L1 side of the power supply for the control circuit through the conductors 93 and 95. The other side of the normally energized coil 91 of the induction relay is connected to the L2 side of the line by the conductor 97. The induction relay is of the single pole, single throw type and is normally in the open circuit position.

The induction relay contacts IRC are connected in parallel across the contacts R1A of the A pole of the two pole, single throw, electro-magnetic relay R1 by conductors 99 and 101. One side of the paralleled contacts IRC of the induction relay and the contacts R1A of the A pole of the electro-magnetic relay R1 is connected to one side of the single pole, single throw, normally closed, time interval relay by the conductor 103, and thence through the contacts of the time interval relay to the line L2 by the conductor 105. The other side of the paralleled contacts IRC and R1A is connected to one side of the operating coil 107 for the time interval relay by the conductor 109, and to one side of the operating coil 111 for the relay R1 by the conductor 113. The other side of the operating coil 107 for the time interval relay is connected to the line L1 through the conductor 95, and the other side of the operating coil 111 for the relay R1 is connected to the line L2 through the conductors 115, 117 and 95.

One side of the operating motor TM for the timer is connected to the line L1 through the conductors 117 and 95. The other side of the timer motor is connected to the L2 side of the line through the contacts R1B of the B pole of the relay R1, the connectors 119, 121, 123 and 105 providing the electrical connections. The contacts R1B of the B pole of the relay R1 are paralleled by the first set of contacts T1 of the timer; the circuit being provided by the conductor 121 and the conductor 125 which connects to the L2 side of the line. A pilot light 127 is connected in parallel across the timer motor TM to indicate when that motor is in operation. The circuit to the pilot lamp is provided by the conductors 129, 131 and 119.

The L2 side of the timer motor TM is also connected to one side of the operating coil 133 for the single pole, electro-magnetic relay R4 through the normally open contacts T7 of the timer switch and the conductors 135, 137 and 119. The other side of the operating coil 133 of the relay R4 is connected to the L1 side of the line through the conductors 139, 141, 117 and 95.

The two-pole, electro-magnetic relay R3 constitutes the operating relay for the main air valve 65. One side of the operating coil 143 for this relay and one of the contacts R3A of the A pole of this relay are connected to the line L1 by the conductors 141, 117, and 95. The other contact R3A of the A pole of the R3 relay is connected to the control solenoid for the air valve by the conductor 145. The L2 side of the operating coil 143 for the R3 relay is connected to the line L2 through the normally closed timer switch T6 and through the normally open contacts R3B of the B pole of the relay, the connections being made by the conductors 147, 149, 151, 153, 155, and 125. The contacts R3B of the B pole of the R3 relay are paralleled by the normally open contacts T4 of the timer relay, the connections being made through the conductors 151, 157 and 149.

The R2 relay is used as the control relay for the solenoid 81 which effects the operation of the three-way valve. One side of the valve solenoid 81 is connected to the L2 side of the line by the conductor 159. The other side is connected to one of the contacts R2B of the B pole of the R2 relay by the conductor 161. The other of the contacts R2B is connected to the L1 side of the line through the normally closed timer switch T5 by the conductors 163, 165, 117, and 95. The timer switch T5 is paralleled by the normally open, pressure switch 167 and by the conductors 169, 93 and 95, which tie to the L1 side of the line. The L2 side of the operating coil 171 for the relay R2 is connected to the L2 side of the line through the R2A contacts of the A pole of the R2 relay by the conductors 173 and 125. The R2A contacts are paralleled by the normally opened timer sitch T3, the connections being made by the conductors 175 and 155. The L1 side of the operating coil 171 for the relay R2 is tied to the conductor 163 by the conductor 177 and the circuit is completed to the L1 side of the line through the paralleled pressure switch and timer switch T5 by the conductors 165, 117, and 95 or by the conductors 167, 169, 93, and 95.

The operation of the line starter is controlled by the single pole, normally open, electro-magnetic relay R4, the timer contacts T2 and T8, the push button switches PB1 and PB2, and a pair of auxiliary contacts LSA which are opened and closed in sequence with the line contacts of the line starter. Power is supplied to the electromagnetic operating coil 179 of the line starter from the lines L1 and L2. The circuit from L1 includes the conductor 181 and the push button switch PB1.

The L2 connection for the operating coil 179 for the line starter includes the push button switch PB2 (if used) the conductor 183, the relay contacts R4A, the conductors 185 and 187, thence through the normally open timer switch T8 and the conductors 189 and 191 to the L2 side of the line. The timer switch T2 is paralleled across the contacts R4A of the relay R4 by means of the conductors 185 and 193. The contacts of the auxiliary line starter switch LSA are paralleled across the contacts of the timer switch T8 by the conductor 189, and the conductors 195, 185, and 187.

The L1 side of the operating coil 133 for the relay R4 is connected to the L1 side of the line by the conductors 139, 141, 117 and 95. The L2 side of the operating coil 133 is connected to the L2 side of the line through the normally open timer switch T7 and the paralleled contacts of the timer switch T1 and the A pole of the relay R1 as previously described.

The operation of the control system will best be understood by reference to the schematic diagram Fig. 6, which illustrates the control system in the normal position for automatic operation. It will be noted that the timer motor TM and the pilot light 127 are deenergized. The operating coil 179 for the line starter is energized through the push button or safety switch PB1 (and PB2, if used), the normally closed timer contacts T2, and the line starter auxiliary switch LSA. The apparatus is so arranged that the line starter for the conveyor motor must be initially started by manual operation. This is a safety precaution. The operating coils for the relay R1, R2, R3 and R4 are deenergized, and the contacts of the pressure switch are open as illustrated.

Assuming that the conveyor 43 or other means is operating to discharge the waste or other material which is to be ejected into the ejector receiver, the material will collect in the receiver 9 until it contacts a predetermined length of the electrode 45 whereupon the operating coil 85 of the induction relay will be sufficiently energized to effect the operation of the induction relay. The operation of this relay closes the relay contacts IRC and thereby effects the energization of the operating coil 111 for the relay R1 and the operating coil 107 for the time interval relay. The relay R1 then operates the contacts R1A and R1B which are closed. The contacts R1A parallel the contacts IRC of the induction relay, and the contacts R1B effect the energization of the timer motor TM.

The time interval provided by the dashpot or other time delay means of the timer interval relay is made sufficiently long to assure the running of the timer motor TM for a sufficient period to effect the closing of the normally opened timer switch T1 which parallels the relay contacts R1B, and as soon as the timer switch T1 is closed, subsequent operation of the timer motor is controlled by the timer contacts and becomes independent of the relay R1. Operation of the timer interval relay de-energizes the operating coil 111 of the relay R1 and the operating coil 107 of the time interval relay. Both relays then return to the normal position.

As the operation of the timer proceeds, the contacts T2 are opened. This de-energizes the operating coil 179 of the line starter, stops the conveyor, and opens the auxiliary contacts LSA of the line starter.

The timer contacts T3 are next to close. This effects the energization of the operating coil 171 of the relay R2 which controls the operation of the three-way valve 65, the circuit being completed through the still closed timer contacts T5. Energization of the operating coil 171 for the relay R2 causes the relay contact R2A and R2B to close. R2A parallels the timer contacts T3 and holds the relay energized independently of the subsequent opening of the timer contacts T3. The closing of the R2B contacts of the relay R2 effects the energization of the three-way valve 65 through a circuit which is completed by the closed timer contacts T5.

The operation of the three-way valve 65 moves the control element 79 of that valve from the position of Fig. 3 to the position of Fig. 4, and admits pressure air to the top of the piston 35 which operates the flapper valve 25. The flapper valve 25 then closes, and is held in a closed position by the pressure air.

The timer contact T4 is next to operate and this effects the energization of the operating coil 143 for the relay R3 which controls the operation of the main air valve 63, the circuit being completed through the still closed timer contacts T6. Operation of the relay R3 closes relay contacts R3A which energizes the main air valve 63 and also closes the R3B contacts which parallel the timer contacts T4 thereby permitting the relay R3 to hold independently of the subsequent opening of the timer contacts T4. Operation of the air valve 63 admits pressure air to the top of the receiver 9 through the main inlet pipe 55 for a period which is determined by the time interval between the closing of the timer contacts T4 (which operates the relay R3) and the opening of the timer contacts T6. Opening of the timer contacts T6 de-energizes the relay R3 and causes the air valve 63 to be shut off. The period of time during which pressure air is admitted to the interior of the receiver can be readily varied in accordance with the material being handled.

Admission of pressure air to the interior of the receiver effects the operation of the pressure switch which is in parallel with the timer contact T5. Hence, the opening of the timer contacts T5 (which occurs at about the same time as the opening of the timer contacts T6 to effect closing of the main air valve 63) does not de-energize the control relay R2 for the three-way valve 65 and that valve remains in the Fig. 4 position until the ejection of the contents of the receiver lowers the pressure sufficiently for the pressure switch to open. At this time, since the contacts T5 have previously been opened and are still open, the operating coil 171 for the relay R2 will be de-energized, the contacts R2A and R2B opened and the three-way valve 65 permitted to return to its normal position illustrated in Fig. 3. When this occurs, the cylinder 37 for the valve operating piston 35 is vented to the air, and the flapper valve 25 thereupon returns to its open position.

Subsequent operation of the timer effects the closure of the contacts T7 which energizes the operating coil 133 for the relay R4 and closes the contacts R4A of that relay. At about this same time the timer contacts T8 are also closed, and the circuit for the operating coil 179 of the line starter or other control means for the conveyor 43 is re-energized. This causes the conveyor or other delivery means to start up. The timer contacts T2 are now or previously may have been closed.

Further operation of the timer contacts opens the contacts T7 which de-energizes the relay R4, thereby causing the relay contacts R4A to be opened and the LSA contacts to be closed; opens the timer contacts T8, and finally opens the contacts T1 which stops the timer motor TM. The conveyor motor continues to operate notwithstanding the opening of the contacts T8 and R4A since these contacts are paralleled by the then closed contacts LSA and T2. The timer apparatus and the complete control system is then restored to the normal running position, as illustrated in Fig. 6, and is ready to repeat the cycle. The pilot light 127 is lit when the timer motor TM is energized and provides a convenient means for indicating when the timer mechanism is running.

If it is desired to operate the apparatus under hand control this may be done by moving the main control switch 81 to the H or hand operated position as shown by the schematic diagram of Fig. 6. Movement of the control switch 81 to this position will effect immediate operation of the induction relay, and the same sequence of control operations as previously described will take place. It is also possible to effect the operation of the apparatus by the use of a cyclic timing means. To do this, the main control switch is put into automatic position, and a cyclic control switch of any standard type is connected across the terminals of the operating coil of the induction relay in place of the electrode connections.

An important feature of the invention is the means provided for effecting automatic cleaning of the electrode shield 49 which is illustrated particularly in Figs. 1 and 2. The electrode shield 49, as previously described, is a cylindrical cup extending downwardly into the receiver tank 9 and the electrode 45 is located centrally of this cup. During normal operation it has been found that there has been a tendency for material to collect in this shield and since this sometimes adversely affects the operation of the control mechanism, an automatic cleaning means for the electrode shield and insulator has been provided. This means constitutes a jet type, air inlet 197 which is supported in the upper end of the shield 49 and is arranged to direct a stream of air circularly of the shield in the region of the electrode insulator 47. This jet tube 197 is connected to the main air inlet pipe 55 by a suitable conduit 199, and it will be noted that air will be caused to flow through the jet tube 197 during each operation of the apparatus.

The ejector apparatus described in the foregoing, is a much simpler and much more satisfactory device than the arrangements previously known to the art. A particular advantage of the apparatus consists in its use of only one valve at the inlet end of the ejector, as contrasted with the use in the prior structures of a valve or valves at both the inlet and the outlet ends of the receiver. The elimination of all valves except for the single valve at the inlet end of the receiver is a most important feature of the invention and contributes substantially to its improved reliability of operation.

Various types of pneumatic ejectors and control systems therefor may be constructed in accordance with the principles disclosed in the foregoing. Accordingly, it is my desire that the accompanying claims shall be given the broadest reasonable construction consistent with the language appearing therein.

I claim:

1. In apparatus of the class described, an elongated, upright receiver having an inlet opening adjacent its top and an outlet opening adjacent its bottom, conveyor means actuable to deliver material to be handled by said apparatus into said receiver through said inlet opening, a flap valve movable to open and to close the said inlet opening in said receiver, an air motor for operating said flap valve, a source of pressure air, means including a conduit and a three way valve for connecting said source of pressure air to said air motor, said three way valve being movable from a normal vent position, in which position said source of pressure air is disconnected from said air motor and said air motor is vented to the atmosphere, to an operating position, in which position said vent is closed and said air motor is connected to said source of pressure air, means including other conduit means and a main air valve for connecting said source of pressure air to the upper end of said receiver, said main air valve being movable from a normal closed position, in which position said source of pressure air is disconnected from said receiver, to an operating position, in which position pressure air is admitted to the upper end of said receiver, and an electrical control means including a timer mechanism which is operable to effect sequentially the stopping of said conveyor, the movement of said three way valve from the normal to the operating position thereof, thereby effecting movement of said flap valve to the closed position, operation of said main air valve to admit pressure air to the upper end of said receiver for a predetermined period of time sufficient to accomplish the pneumatic ejection of the contents of said receiver, the reclosing of said main air valve, movement of said three way valve to said vent position whereby said flap valve is reopened, and the starting up of said conveyor, said receiver outlet being open at all times during the operation of said apparatus.

2. In apparatus of the class described, an elongated, upright receiver having an inlet opening adjacent its top and an outlet opening adjacent its bottom, conveyor means actuable to deliver material to be handled by said apparatus into said receiver through said inlet opening, a flap valve movable to open and to close the said inlet opening in said receiver, means including a cylinder and a piston movable in said cylinder for operating said flap valve, a source of pressure air, means including a conduit and a three-way, electrically operated valve for connecting said source of pressure air to said piston and cylinder, said three-way valve being movable from a normal vent position, in which position said source of pressure air is disconnected from said piston and cylinder and said cylinder is vented to the atmosphere, to an operating position, in which position said vent is closed and said piston and cylinder are connected to said source of pressure air, means including other conduit means and an electrically operated main air valve for connecting said source of pressure air to the upper end of said receiver, said main air valve being movable from a normal closed position, in which position said source of pressure air is disconnected from said receiver, to an operating position, in which position pressure air is admitted to the upper end of said receiver, and electrically operated control means, including a motor driven timer and a relay for operating each of said electrically operable valves, which is actuable to effect sequentially the stopping of said conveyor, movement of said three-way valve to the operating position thereof, thereby effecting movement of said flap valve to the closed position, operation of said main air valve to admit pressure air to the upper end of said receiver for a predetermined period of time sufficient to accomplish the pneumatic ejection of the contents of said receiver, the closing of said main air valve, movement of said three-way valve to said normal vent position whereby said piston and cylinder are vented and said flap valve is opened, and the starting up of said conveyor, said receiver outlet being open at all times during the operation of said apparatus.

HAROLD T. JEFFERY.